US010448069B2

(12) United States Patent
Rodriguez et al.

(10) Patent No.: US 10,448,069 B2
(45) Date of Patent: Oct. 15, 2019

(54) PVR ASSIST INFORMATION FOR HEVC BITSTREAMS

(71) Applicant: Cisco Technology, Inc., San Jose, CA (US)

(72) Inventors: Arturo A. Rodriguez, Norcross, GA (US); Kevin Murray, Hampshire (GB); Hsiang-Yeh Hwang, Duluth, GA (US); Akira Osamoto, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 417 days.

(21) Appl. No.: 15/017,581

(22) Filed: Feb. 5, 2016

(65) Prior Publication Data
US 2016/0234537 A1    Aug. 11, 2016

Related U.S. Application Data

(60) Provisional application No. 62/112,460, filed on Feb. 5, 2015, provisional application No. 62/112,632, filed
(Continued)

(51) Int. Cl.
*H04N 21/2387* (2011.01)
*H04N 21/845* (2011.01)
(Continued)

(52) U.S. Cl.
CPC ......... *H04N 21/2387* (2013.01); *H04N 5/783* (2013.01); *H04N 19/44* (2014.11);
(Continued)

(58) Field of Classification Search
CPC .... H04N 19/70; H04N 21/4384; H04N 19/46; H04N 21/6587; H04N 21/2387;
(Continued)

(56) References Cited

U.S. PATENT DOCUMENTS 9,026,671 B2    5/2015  Gillies et al.
2010/0215338 A1*  8/2010  Rodriguez ............... H04N 5/76
386/343

(Continued)

FOREIGN PATENT DOCUMENTS

EP    2757795 A1    7/2014

OTHER PUBLICATIONS

U.S. Appl. No. 15/017,572, filed Feb. 5, 2016 entitled "Method and System for Processing HEVC Coded Video in Broadcast and Streaming Applications".
(Continued)

*Primary Examiner* — Benjamin R Bruckhart
*Assistant Examiner* — Akshay Doshi
(74) *Attorney, Agent, or Firm* — Merchant & Gould P.C.

(57) ABSTRACT

Methods and systems for processing a video stream are disclosed. A first tier value may be assigned to each of a plurality of SHRAP pictures in a first video stream. A reference tier value may be assigned to pictures in the first video stream that may be used as reference pictures. A plurality of discard tier values may be assigned to pictures in the first video stream that may be discarded during trick mode operations and do not depend on other pictures assigned one of the plurality of discard tier values. A trick mode operation may then be performed, wherein the presentation of pictures in the first video stream is dependent upon assignment of tier values.

20 Claims, 5 Drawing Sheets

Related U.S. Application Data on Feb. 5, 2015, provisional application No. 62/114,145, filed on Feb. 10, 2015.

(51) Int. Cl.

| | | |
|---|---|---|
| *H04N 21/6587* | (2011.01) | |
| *H04N 19/503* | (2014.01) | |
| *H04N 19/70* | (2014.01) | |
| *H04N 19/44* | (2014.01) | |
| *H04N 19/65* | (2014.01) | |
| *H04N 19/46* | (2014.01) | |
| *H04N 19/593* | (2014.01) | |
| *H04N 5/783* | (2006.01) | |
| *H04N 21/438* | (2011.01) | |
| H04N 19/423 | (2014.01) | |

(52) U.S. Cl.
CPC .......... *H04N 19/46* (2014.11); *H04N 19/503* (2014.11); *H04N 19/593* (2014.11); *H04N 19/65* (2014.11); *H04N 19/70* (2014.11); *H04N 21/4384* (2013.01); *H04N 21/6587* (2013.01); *H04N 21/8451* (2013.01); *H04N 19/423* (2014.11)

(58) Field of Classification Search
CPC .. H04N 5/783; H04N 19/593; H04N 21/8451; H04N 19/503; H04N 19/44; H04N 19/65; H04N 19/423
See application file for complete search history.

(56) References Cited

U.S. PATENT DOCUMENTS

| 2015/0195561 | A1* | 7/2015 | Wang ................... H04N 19/52 |
| | | | 375/240.16 |
| 2016/0234527 | A1 | 8/2016 | Rodriguez et al. |
| 2016/0323609 | A1* | 11/2016 | Yoon .................. H04N 21/2387 |

OTHER PUBLICATIONS

Partial International Search Report dated May 4, 2016 cited in Application No. PCT/US2016/016902, 13 pgs.

Recommendation ITU-T H.265, "High Efficiency Video Coding", Series H: Audiovisual and Multimedia Systems Infrastructure of audiovisual services—Coding of moving video, International Telecommunication Union, Geneva, CH, Apr. 13, 2013, pp. 1-317, XP017578238.

Anonymous, "AVC Video Systems and Transport Constraints for Cable Television," Society of Cable Telecommunications Engineers, Engineering Committee, Digital Video Subcommittee, American National Standard ANSI/SCTE 128 2010-a, Jan. 1, 2010, XP030001609, 42 pgs.

Thomas Schierl et al., "System Layer Integration of High Efficiency Video Coding," IEEE Transactions on Circuits and Systems for Video Technology, IEEE Service Center, Piscataway, NW, vol. 22, No. 12, Dec. 1, 2012, pp. 1871-1884, XP011487157.

ITU-T Recommendation H.264, "Advanced video coding for generic audiovisual services," Series H: Audiovisual and Multimedia Systems Infrastructure of audiovisual services—Coding of moving video, International Telecommunication Union, Geneva, CH, Mar. 1, 2005, pp. 1-343, XP017465245.

Society of Cable Telecommunications Engineers, Engineering Committee Digital Video Subcommittee, American National Standard, ANSI/SCTE 215-1 2015, "HEVC Video Constraints for Cable Television Part I-Coding," ii American National Standard, Dec. 1, 2015, XP055267744, retrieved from the Internet: URL:http://www.scte.org/SCTEDocs/Standards/ANSI_SCTE 215-1.pdf, 23 pgs.

International Search Report dated Jun. 3, 2016 cited in Application No. PCT/US2016/016903, 13 pgs.

"Digital Video Broadcasting (DVB); Specification for the use of Video and Audio Coding in Broadcasting Applications based on the MPEG-2 Transport Stream," Technical Specification, European Telecommunications Standards Institute (ETSI), 650, Route des Lucioles, F-06921 Sophia-Antipolis; France, vol. Broadcas, No. V1.11.1, Nov. 1, 2012, XP014092645, 195 pgs.

International Search Report dated Jul. 11, 2016 cited in Application No. PCT/U52016/016902, 26 pgs.

Office Action issued in U.S. Appl. No. 15/017,572, dated Oct. 18, 2018, 21 pages.

Final Office Action issued in U.S. Appl. No. 15/017,572, dated Apr. 4, 2019, 13 pages.

First Office Action and Search Report dated Jul. 3, 2019, cited in Chinese Patent Application No. 201680007977.3, 19 pages.

* cited by examiner

PVR ASSIST INFORMATION FOR HEVC BITSTREAMS

CROSS-REFERENCE TO RELATED APPLICATIONS

Under provisions of 35 U.S.C. § 119(e), Applicants claim the benefit of U.S. Provisional Application No. 62/112,460, filed Feb. 5, 2015, U.S. Provisional Application No. 62/112,632, filed Feb. 5, 2015, and U.S. Provisional Application No. 62/114,145, filed Feb. 10, 2015, which are incorporated herein by reference.

TECHNICAL FIELD

This disclosure relates in general to processing of video signals, and more particularly, to supporting PVR functionality in HEVC streams.

BACKGROUND

Trick modes, also known as video playback modes other than the normal playback mode intended for a video program may be desirable for a user that wishes to implement modes such as fast forward playback, fast reverse playback, slow forward playback, slow reverse playback, forward frame (or picture) stepping, reverse frame (or picture) stepping, and pause. Coupled with random access that enables entry at points of a coded video stream where a decoder can start decoding the coded video stream (referred to herein as a bitstream), trick modes may be supported for applications such as personal video recording ("PVR"), digital video recording ("DVR"), and video on demand ("VOD").

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Methods and systems for processing a video stream are disclosed. A first tier value may be assigned to each of a plurality of SHRAP pictures in a first video stream. A reference tier value may be assigned to pictures in the first video stream that may be used as reference pictures. A plurality of discard tier values may be assigned to pictures in the first video stream that may be discarded during trick mode operations and do not depend on other pictures assigned one of the plurality of discard tier values. A trick mode operation may then be performed, wherein the presentation of pictures in the first video stream is dependent upon assignment of tier values.

Embodiments of the present disclosure specify the creation of an HEVC coded video elementary stream and is intended for video services applications such as broadcast, time-shifting (e.g., PVR/DVR service), Video-on-Demand services, and splicing (e.g., Ad-insertion) that could employ the specifications described herein. There exists a need in High Efficiency Video Coding ("HEVC") bitstreams to provide assistance information to help applications effectuate requested trick modes.

The following definitions and acronyms are used in the present disclosure

| Acronyms | |
|---|---|
| AFD | Active Frame Descriptor |
| AF | Adaptation Field of an MPEG-2 TS packet |
| ATSC | Advanced Television Systems Committee |
| AU | Access Unit |
| BSLBF | bit string, left bit first |
| BLA | Broken Link Access |
| CPB | Coded Picture Buffer |
| CRA | Clean Random Access |
| DPI | Digital Program Insertion |
| DTS | Decoding Time Stamp |
| EBP | Encoder Boundary Point |
| ESPI | Elementary_Stream_Priority_Indicator |
| HDTV | High Definition Television |
| IEC | International Electrotechnical Commission |
| ISO | International Organization for Standardization |
| MPEG | Moving Picture Experts Group |
| NAL | Network Abstraction Layer |
| nPVR | Network based Personal Video Recorder |
| PCR | Program Clock Reference |
| PES | Packetized Elementary Stream |
| PMT | Program Map Table |
| PTS | Presentation Time Stamp |
| PVR | Personal Video Recorder |
| RAI | Random_Access_Indicator |
| RAP | Random Access Point |
| SHRAP | Random Access Point as described in U.S. Provisional Application No. 62/112,632 filed Feb. 5, 2015, which is hereby incorporated by reference. |
| T-STD | Transport Stream System Target Decoder |
| TS | Transport Stream |
| UIMSBF | An unsigned integer, transmitted most significant bit first |
| VOD | Video on Demand |
| xDVR | Generic Digital Video Recorder |

Definitions

HEVC-ITU-T Rec. H. 265|ISO/IEC 23008-2:2013

High Efficiency Video Coding Program—An ISO-IEC 13818-1 MPEG-2 Program

SHRAP Picture—The intra coded picture that is part of an SHRAP Access Unit, where Access Unit is according to the HEVC Specification referenced herein.

xDVR—Generic DVR implementation. This could be 'Cloud DVR (cDVR)', 'Network DVR (nDVR), local DVR or any other generic DVR.

Embodiments of the present disclosure specifies signals or messages that pertain to information that provisions trick modes and random access in data fields of the transport stream that carries the plural elementary streams of a video program. In one embodiment, the transport stream can be MPEG-2 transport as specified in ISO/IEC 13818-1, (2007), "Information Technology—Generic coding of moving pictures and associated audio—Part 1: Systems," which is incorporated herein by reference. The information that provisions trick modes is referred herein as PVR assistance information. Furthermore, this document pertains to video streams that correspond to picture sequences that have been coded according to the HEVC video coding specification, specified by ITU-T Rec H.265|ISO/IEC 23008-2—MPEG-H Part 2: High Efficiency Video Coding, which is incorporated herein by reference.

The PVR assist information is used to signal information with the aim of helping applications, such as PVR and VOD, to perform trick-play operations but does not mandate any specific PVR device behavior, but rather the application or receiving device (or processing device that processes the bitstream in a receiver) may effect a certain behavior of trick mode based on the PVR assist information. The information herein is specific to a video stream coded according to the H.265/HEVC video coding specification, specified by ITU-T Rec H.265|ISO/IEC 23008-2—MPEG-H Part 2: High Efficiency Video Coding, incorporated herein by reference. MPEG-2 transport specified in ISO/IEC 13818-1, (2013) provisions carriage of HEVC in MPEG-2 Transport and is incorporated herein by reference.

"HEVC Specification" as used in the present disclosure refers to the specification of ITU-T Rec. H. 265|ISO/IEC 23008-2:2013, High Efficiency Video Coding. An "HEVC bitstream" as used in the present disclosure refers to a bitstream in accordance with the HEVC specification. In one embodiment, the HEVC bitstream may further comply with the requirements and/or constraints described in U.S. patent application Ser. No. 15/017,572 filed Feb. 5, 2016, which is hereby incorporated by reference.

The "MPEG-2 TS Specification as used in the present disclosure refers to the specification of ISO/IEC 13818-1, (2013), and as applicable to ISO/IEC 13818-1:2013/FDAM3. An "MPEG-2 TS carrying an HEVC bitstream," or equivalently "MPEG-2 TS," as used in the present disclosure refers to a transport stream in accordance with MPEG-2 TS Specification. Herein, an "MPEG-2 TS carrying an HEVC bitstream," or "MPEG-2 TS," shall be interpreted to further comply with the requirements and/or constraints specified in the present disclosure.

"TS packet" as used in the present disclosure refers to a packet of the MPEG-2 TS in accordance with the MPEG-2 TS Specification. "PMT" as used in the present disclosure refers to the Program Map Table in accordance with the MPEG-2 TS Specification. The term "HEVC Receiver" as used in the present disclosure refers to a device capable of interfacing to a network and receiving a video program in an MPEG-2 TS carrying an HEVC bitstream, such receiver further having the capabilities for processing the received MPEG-2 TS in accordance with the requirements and/or constraints specified herein. A video program as used in the present disclosure may correspond to a television program. A video program may be referred as used in the present disclosure as a "program."

MPEG-2 Transport provides services and features enabled by information carried at the MPEG-2 Transport multiplex level and not at the video elementary stream component level. Some of these services are System Information and Program Guide, Emergency Alerts, and Specification of Private Data Services.

Video T-STD for HEVC may be based on ISO/IEC 13818-1 and may follow the constraints for the profile and level encoded in the video elementary stream in accordance with Appendix A of the HEVC Specification, wherein herein the video elementary stream corresponds to an HEVC bitstream. In some embodiments, the HEVC bitstream may further comply with the normative requirements and/or constraints specified in U.S. patent application Ser. No. 15/017,572 filed Feb. 5, 2016, which is hereby incorporated by reference.

The video elementary stream corresponding to an HEVC bitstream may have a stream_type value equal to 0x24. In one embodiment, an MPEG-2 Program carries at most one HEVC video elementary stream component with a stream_type value of 0x24. In an alternate embodiment, an MPEG-2 Program may carry one or more HEVC video elementary stream components, one of which corresponds to a stream_type value of 0x24. In yet another embodiment, an MPEG-2 Program carries plural HEVC video elementary stream components, of which one must correspond to a stream_type value of 0x24.

A Random Access Point (RAP) may correspond to a signaled location in the MPEG-2 TS that corresponds to a respective location of the HEVC bitstream, where an HEVC Receiver is able to begin decoding the HEVC bitstream. The corresponding respective location of the HEVC bitstream in the context of HEVC is also referred to as a RAP, or an HEVC RAP. In one embodiment, the HEVC RAP corresponds to an SHRAP.

The HEVC RAP may correspond to a location in the HEVC bitstream containing all the parameters necessary to enable an HEVC Receiver with the necessary information to start decoding of the HEVC bitstream from that point in the bitstream.

The first picture in the HEVC bitstream after a signaled RAP in the MPEG-TS, or equivalently after an identified RAP in the MPEG-TS by an HEVC Receiver, may correspond to a "RAP Picture." In one embodiment, the HEVC RAP picture corresponds to an SHRAP Picture as specified in U.S. patent application Ser. No. 15/017,572 filed Feb. 5, 2016, which is hereby incorporated by reference.

In one embodiment, the presence of private data bytes in the adaptation field of TS packets may be announced by providing a corresponding AF data descriptor in the descriptor loop of the corresponding video program element of the PMT. The AF descriptor is provided as a "tag-length" data format as shown in Table A below. The tag value provided in the AF descriptor signals that the AF data in TS packets conforms to a corresponding data structure syntax and semantics, as specified by a standards organization. The "descriptor_length" data field in Table A corresponds to the number of bits immediately following the signaled tag value. In one embodiment, the descriptor_length is equal to 0x00 since the AF data descriptor serves as an announcement of AF private data.

TABLE A adaptation field data descriptor

| Syntax | Number of bits | Identifier |
| --- | --- | --- |
| adaptation_field_data_descriptor( ){ | | |
| descriptor_tag | 8 | uimsbf |
| descriptor_length | 8 | uimsbf |
| } | | |

In accordance with the MPEG-2 TS Specification, the presence of an AF in a TS packet may be signaled by the adaptation_field_control in the header of the TS packet. The presence of private data bytes in the AF of the TS packet may be signaled by transport_private_data_flag at the start of the AF. The presence of private data in the AF of a TS packet, specified as private_data_byte, shall be in accordance with Table B.

TABLE B

| private_data_byte | | |
|---|---|---|
| Syntax | No. of Bits | Format |
| private_data_byte { for i=0 to n { tag length If (tag==0xDF) format identifier data( ) } } | 8 8  32 var | bslbf bslbf  bslbf |

The length data field may correspond to the number of provided bytes following it. The format_identifier field conforms to the MPEG-2 TS Specification, Section 2.6.9, Section 2.10, and Annex 0. The data field may correspond to a variable number of bytes in accordance with the data structure syntax and semantics that respectively correspond to the value of the tag field. Even though multiple collections of tag, length, data may be contained in consecutive TS packets, each collection of tag, length, data may be contained within one TS packet only.

When AF private data corresponds to PVR_assist_information the value of tag may correspond to a respective tag value corresponding to PVR_assist_information. In one embodiment, the value of tag corresponding to PVR_assist_information may be 0x03. The syntax and semantics for PVR assist information when the value of tag is equal to the tag value corresponding to PVR_assist_information (e.g., tag value 0x03) can be found in Appendix A. For simplifying the following description related to PVR assist information, tag value corresponding to PVR_assist_information is equal to 0x03.

PVR applications using the PVR_assist_information described herein shall use tag value 0x03 in the adaptation field of the TS packet. When used, tag value 0x03 may be present in the adaptation field of the TS packet at the start of each video access unit. It is not recommended to use multiple tag values in the same program. Applications may ignore tag value 0x02 in the adaptation field of TS packets and its corresponding information.

PVR_assist_information may be used by applications such as PVR and nPVR and if present shall be carried as private data in the AF of a TS packet. PVR assist information may be used to aid applications that perform a range of operations including trick play. Examples of such applications include local storage based Personal Video Recorders (PVR), network PVR (nPVR) and Video On Demand (VOD). These applications are collectively referred herein as PVR applications. The PVR assist information corresponds to unencrypted information in the TS that signals picture dependencies that cannot easily be determined without otherwise deep inspection into the HEVC bitstream.

PVR applications may include applications with different requirements for playing back video in a playback mode other than normal playback (i.e., forward at 1× speed), which are often referred to as trick modes. Some of the PVR applications use local storage based, while others may be network based storage such as network PVR and VOD.

When PVR_assist_information is present, it shall be in the TS packet that contains the start of each AU of the HEVC bitstream. A TS packet containing the first byte of a PES packet header of a RAP picture, herein referred to as the SHRAP picture, shall have private data in the AF, and the payload_unit_start_indicator bit shall be set to '1' in the TS packet header and the adaptation_field_control bits shall be set to '11' in accordance with the MPEG-2 TS Specification. In addition, the random_access_indicator bit in the Adaptation Field of the TS packet that contains the first byte of the PES packet header corresponding to the first byte of the SHRAP shall be set to '1'.

In some embodiments, when PVR_assist_information is present in the HEVC bitstream, the first tag value in the AF of the TS packet may be the tag value corresponding to PVR_assist_information. The PVR_assist_information may be present in the transport packet corresponding to the start of each video access unit. The PVR_assist_information shall only be present in the transport packet corresponding to the start of each video access unit.

In other embodiments, when PVR_assist_information is present in the HEVC bitstream, the only tag value the in the AF of the TS packet shall be the tag value corresponding to PVR_assist_information. The PVR_assist_information shall be present in the transport packet corresponding to the start of each video access unit. The PVR_assist_information shall only be present in the transport packet corresponding to the start of each video access unit.

The PVR_assist information syntax is according to the following table.

| PVR_assist_information data field | | |
|---|---|---|
| Syntax | No. bits | Mnemonic |
| PVR_assist_information( ) { | | |
|   data_field_tag | 8 | uimsbf |
|   data_field_length | 8 | uimsbf |
|   if (data_field_length > 0) { | | |
|     PVR_assist_tier_pic_num | 3 | uimsbf |
|     PVR_assist_block_trick_mode_present_flag | 1 | bslbf |
|     PVR_assist_shall_be_zero | 3 | "000" |
|     PVR_assist_extension_present_flag | 1 | bslbf |
|     if (PVR_assist_block_trick_mode_present_flag == "1") { | | |
|       PVR_assist_pause_disable_flag | 1 | bslbf |
|     PVR_assist_fwd_slow_motion_disable_flag | 1 | bslbf |
|       PVR_assist_fast_fwd_disable_flag | 1 | bslbf |
|       PVR_assist_rewind_disable_flag | 1 | bslbf |
|       PVR_assist_reserved_0 | 4 | "0000" |
|     } | | |
|     if (PVR_assist_extension_present_flag == "1") { | | |
|       PVR_assist_shall_be_zero | 3 | "000" |
|       PVR_assist_temporal_id_info_present_flag | 1 | bslbf |
|       PVR_assist_reserved_0 | 4 | "0000" |
|       if (PVR_assist_temporal_id_info_present_flag == "1") { | | |
|         PVR_assist_max_temporal_id | 3 | uimsbf |
|         PVR_assist_reserved_0 | 5 | "00000" |
|       } | | |
|     } | | |
|     for (i=0; i<n; i++) { | | |
|       PVR_assist_reserved_byte | 8 | uimsbf |
|     } | | |
|   } | | |
| } | | |

In other embodiments the PVR_assist_information syntax is according to the following table.

| PVR_assist_information data field | | |
|---|---|---|
| Syntax | No. bits | Mnemonic |
| PVR_assist_information( ) { | | |
|   data_field_tag | 8 | uimsbf |
|   data_field_length | 8 | uimsbf |
|   if (data_field_length > 0) { | | |
|     PVR_assist_tier_pic_num | 3 | uimsbf |
|     PVR_assist_block_trick_mode_present_flag | 1 | bslbf |
|       PVR_assist_pic_struct_present_flag | 1 | bslbf |
|     PVR_assist_shall_be_zero | 3 | "000" |
|     PVR_assist_extension_present_flag | 1 | bslbf |
|     if (PVR_assist_block_trick_mode_present_flag == "1") { | | |
|       PVR_assist_pause_disable_flag | 1 | bslbf |
|     PVR_assist_fwd_slow_motion_disable_flag | 1 | bslbf |
|       PVR_assist_fast_fwd_disable_flag | 1 | bslbf |
|       PVR_assist_rewind_disable_flag | 1 | bslbf |
|       PVR_assist_reserved_0 | 4 | "0000" |
|     } | | |
|     if (PVR_assist_pic_struct_present_flag == "1") { | | |
|       PVR_assist_pic_struct | 4 | uimsbf |
|       PVR_assist_reserved_0 | 4 | "0000" |
|     } | | |
|     if (PVR_assist_extension_present_flag == "1") { | | |
|       PVR_assist_shall_be_zero | 3 | "000" |
|       PVR_assist_temporal_id_info_present_flag | 1 | bslbf |
|       PVR_assist_reserved_0 | 4 | "0000" |
|       if | | |
| (PVR_assist_temporal_id_info_present_flag == "1") { | | |
|       PVR_assist_max_temporal_id | 3 | uimsbf |
|       PVR_assist_reserved_0 | 5 | "00000" |
|       } | | |
|     } | | |
|     for (i=0; i<n; i++) { | | |
|       PVR_assist_reserved_byte | 8 | uimsbf |
|     } | | |
|   } | | |

In some embodiments, a field-coded HEVC bitstream shall not contain non-paired fields.

The "PVR_assist_tier_pic_num" data field in PVR_assist_information above corresponds to the signaling of picture interdependencies. A hierarchy of data dependency tiers contains at most a maximum number of tiers.

In some embodiments, when the tier number corresponding to each SHRAP picture in a coded video sequence is assigned to 1 (and therefore received and/or determined equal to 1 by an HEVC Receiver), each picture in the HEVC bitstream that is not an SHRAP may be assigned a tier value greater than "1" according to their picture interdependencies. Specifically, each non-SHRAP pictures may be assigned a tier value equal to the corresponding picture's temporal_id+2.

The maximum tier value allowed is "7" and there may be no gaps present in the successive tier values. Since the maximum temporal id value possible per the HEVC Specification is equal to 6, in this embodiment, an HEVC bitstream is constrained to pictures with a corresponding temporal_id value no greater than 5. In this embodiment, a picture with temporal id equal to 0 that is an SHRAP may be assigned tier value 1. All other pictures, including pictures with temporal id equal to 0 that are not an SHRAP picture, may be assigned a tier value equal to its temporal id+2.

In alternate embodiments, when the tier number corresponding to each SHRAP picture in a coded video sequence is assigned to 0 (and therefore received and/or determined equal to 0 by an HEVC Receiver), each picture in the HEVC bitstream that is not an SHRAP is assigned a tier value greater than "0" according to their picture interdependencies. Specifically, each non-SHRAP pictures is assigned a tier value equal to the corresponding picture's temporal_id+1.

The maximum tier value allowed is "7" and there are no gaps present in the successive tier values. Since the maximum temporal id value possible per the HEVC Specification is equal to 6, in this embodiment, an HEVC bitstream is not constrained from the maximum temporal_id value allowed. In this embodiment, a picture with temporal id equal to 0 that is an SHRAP is assigned tier value 1. All other pictures, including pictures with temporal id equal to 0 that are not an SHRAP picture, are assigned a tier value equal to its temporal id+1.

In yet another embodiment the tier number corresponding to each SHRAP picture in an HEVC bistream sequence may be assigned to 0 or 1 (and therefore received and/or determined equal to 0 or 1, respectively, by an HEVC Receiver). When the tier value corresponding to the SHRAP picture is 0, the tier value of each picture in the HEVC bitstream equals the picture's temporal_id+1. When the tier value corresponding to the SHRAP picture is 1, the tier value of each picture in the HEVC bitstream equals the picture's temporal_id+2.

In one embodiment, pictures with a temporal id value equal to PVR_assist_max_temporal_id as provided by PVR_assist information are assigned tier value equal to 7 and there may be a gap in the tier values assigned to pictures. In another embodiment pictures with a temporal id value equal PVR_assist_max_temporal_id as provided by PVR_assist information may be assigned tier value equal to 6 or 7 and there may be one gap in the tier values assigned to pictures.

In another embodiment, pictures with a temporal id value equal PVR_assist_max_temporal_id as provided by PVR_assist information are assigned tier value equal to 7 only if the picture is not a reference picture in accordance with the HEVC Specification. In yet another embodiment, pictures with a temporal id value equal PVR_assist_max_temporal_id as provided by PVR_assist information are assigned tier value either equal to 6 or 7 only if the picture is not a reference picture in accordance with the HEVC Specification.

When present, the PVR assist information may be carried using the syntax defined in Annex D.3.6 of ETSI/TS 101 154. The data field length in PVR_assist_information shall have a value greater than or equal to "0x01". A value of "0x01" for this field may indicate that the stream meets the SHRAP interval requirements specified in the present disclosure document, includes a correct value for 'PVR_assist_tier_pic_num' (tier number), conveys the 'PVR_assist_tier_pic_num' syntax element for each picture.

In some embodiments, the following syntax elements shall be set to '0': 1) pvr_assist_pic_struct_present_flag; 2) pvr_assist_tier_next_pic_in_tier_present_flag; and 3) pvr_assist_substream_info_present_flag. When present, the following syntax elements shall be set to '0': 1) PVR_assist_segmentation_info_present_flag; 2) PVR_assist_tier_m_cumulative_frames_present$_{13}$ flag; and 3) PVR_assist_tier_n_mmco_presentflag In the case that any of the above flags is not set to zero, the remainder of the descriptor may be ignored.

A value of "data_field_length" greater than "0x01" indicates that optional PVR assist information fields defined in Annex D.3 of ETSI/TS 101 154 are present. In addition, network equipment may optionally remove this additional PVR assist information if present. If network equipment removes this optional information and changes the data_field_length to 0x01, the resulting adaptation field shall conform to ISO/IEC 13818-1.

Two schemes for the assignment of the tier number are possible according to embodiments of the present disclosure. Only one scheme shall be used for a program; i.e. the scheme cannot change during a program. If the tier number of the SHRAP picture is 1, then the following shall apply: 1) Tier 1 is assigned to the SHRAP pictures. All tier 1 pictures are SHRAPs and all SHRAPs are assigned to tier 1. This represents the lowest level of extractability. 2) Tiers 2 through 5 are pictures that may be used as reference pictures and are intended to be extracted for trick mode operations. 3) Tiers 6 and 7 are assigned to pictures that are may be discarded during trick mode operations, and which do not depend on other tier 6 or 7 pictures. 4) Tier 0 shall not be used. 5) Field pictures that belong to the same frame shall have the same tier number.

In embodiments, if the tier number of the SHRAP picture is 0, then the following shall apply: 1) Tier 0 is assigned to the SHRAP pictures. All tier 0 pictures shall be SHRAP and all SHRAPs are assigned tier 0. 2) For all other pictures, the tier number shall be TemporalID+1. In this case, discardable pictures may have any tier number, and field pictures may have differing tier numbers.

In further embodiments, the tier scheme that applies to a program is identified by examining the tier number that is applied to the SHRAP. If the SHRAP has tier 1 then the first scheme applies, and if the SHRAP has tier 0 then the second scheme applies.

PVR Assist Information

In some embodiments, the tier value may equal the temporal_id of a picture (as derived from NAL unit header information) when temporal id value is derived equal to 0 and the picture is an SHRAP. Otherwise, the tier value may equal the temporal id of picture.

In other embodiments, the tier value may equal the temporal_id of a picture (as derived from NAL unit header information) when temporal id value is derived equal to 0 and the picture is an intra coded picture. Otherwise, the tier value may equal the temporal id of picture.

In yet another embodiment, if maxNumSubLayersMinus1 is greater than 1, for pictures with temporal id equal to maxNumSubLayersMinus1, the tier value of the corresponding picture may be 7. In yet another alternate embodiment, if maxNumSubLayersMinus1 is greater than 1, for pictures with temporal id equals maxNumSubLayersMinus1, the tier value of the corresponding picture may be either 6 or 7.

In yet another alternate embodiment, if maxNumSubLayersMinus1 is greater than 1, for pictures with temporal id equal to maxNumSubLayersMinus1, the tier value of the corresponding picture may be either 6 or 7 if the picture is a non-reference picture. It should be noted that in the latter set of embodiments, when maxNumSubLayersMinus1 is greater than 1, the tier may not be equal to temporal id+1.

In an alternate embodiment, the tier value is not equal temporal id+1 for pictures with temporal id equal to maxNumSubLayersMinus1 if maxNumSubLayersMinus1 is greater than a threshold specified in the adaptation field of an MPEG-2 Transport packet, and where the threshold is greater or equal to 1. If a picture's temporal id is equal to maxNumSubLayersMinus1, the picture's tier value may be mapped to 7 in one embodiment, or to 6 or 7 in another embodiment.

According to embodiments of the present disclosure, PVR assist information may be present at the start of each video access unit. PVR assist information may be carried in the Adaptation Field of MPEG-2 transport packets in non-encrypted form. PVR assist information, expressed by "PVR_assist_tier_pic_num" may pertain to picture interdependencies with successive tier numbers, such that if decoding starts at a RAP of the bitstream, wherein the bitstream corresponds to the HEVC compressed version of the respective picture sequence of a video program, a self-decodable sub-stream can be extracted.

In some embodiments, the PVR assist information may include a flag that signals to an application or processing device of the bitstream (such as a video program receiver) to disable or block trick modes over a corresponding segment or portion of the bitstream in which the flag is effective. When trick modes are blocked over a segment comprising of successive RAPs, the flag may be signaled at each RAP (random access point) over the duration of the segment to maintain its persistence. Each respective portion or segment where trick modes are disabled or blocked may be processed only in normal playback mode by the application or processing device. In one embodiment, trick modes may be disabled for certain commercials or advertisements, such as for particular commercials or advertisements that have such rights (e.g., a commercial provider paid a certain fee to an operator or broadcaster for such rights). As an example, the flag pvr_assist_block_trick_mode_presentflag may signal the presence of a blocking trick modes signal.

In one embodiment, a PES (packetized elementary stream) packet, as specified in MPEG-2 Transport, is constrained to contain no more than one video access unit (AU) start, where AU is as specified in the HEVC specification referenced above. The constraint is that there be no more than one video access unit (AU) start per PES packet, such that each PES packet shall contain exactly one AU. In yet another embodiment, the first payload byte after the PES header may be the start of the AU. The "data_alignment_indicator" in the PES header may be set to a value of "1".

To facilitate random access periodically without introducing excessive channel change time in TV networks, the maximum time interval between successive RAP pictures may be less than or equal to a certain amount of time. For example, the maximum time interval may be close to a 1.0 second with a plus delta of time to facilitate scene change adjustments in video coding or efficient video coding with GOP (group of pictures) structures that are powers of two or multiples of two.

In one embodiment, a RAP access unit may include exactly one VPS, one Sequence Parameter Set (SPS) (that is active) with VUI, and at least one Picture Parameter Set (PPS) that is required for decoding the associated picture. The SPS shall precede any SEI NAL units that may be present in the RAP access unit.

In one embodiment, any prefix SEI NAL units (as specified in the HEVC specification) associated with an access unit (AU) may precede in the AU the NAL unit corresponding to the first coded slice of the AU, and any suffix SEI NAL units (as specified in the HEVC specification) associated with the access unit (AU) shall precede in the AU the NAL unit corresponding to the last coded slice of the AU.

A RAP picture associated with a RAP of the bistream may correspond to IDR, CRA, or BLA, where IDR, CRA, BLA are as specified by the HEVC specification. All the VCL NAL units of a RAP picture may have the same nal_unit_type. The RAP picture associated with a picture in the bitstream (i.e., the picture's associated RAP picture) may be the closest prior RAP picture in the bitstream (i.e., the prior RAP in decode order).

When the decoding of an HEVC bitstream starts at a RAP picture that is a BLA picture with NAL unit type equal to BLA_W_LP or a CRA picture with NAL unit type equal to CRA_NUT, any picture that immediately follows the RAP picture that is a RASL pictures is not decodable by the HEVC decoder. This is because a RASL picture may contain references to pictures that are not present in the bitstream (i.e, references to pictures that were in the bitstream prior to its associated RAP picture). Thus, when decoding of an HEVC bitstream starts at a RAP picture that is a BLA picture with NAL unit type equal to BLA_W_LP or a CRA picture with NAL unit type equal to CRA_NUT, RASL pictures associated with the RAP picture are not decodable.

When decoding of an HEVC bitstream starts at a RAP picture with NAL unit type equal to CRA_NUT, the value of the variable HandleCraAsBlaFlag shall be equal to 1 and the variable NoRaslOutputFlag shall be set equal to HandleCraAsBlaFlag. In some embodiments, information related to a tier framework describes signaling for extractable and decodable sub-sequences based on pictures interdependencies. This allows the PVR application to efficiently select pictures when performing a given trick-mode.

A hierarchy of data dependency tiers may contain at most N tiers. In one embodiment, N equals 7. The tiers are ordered hierarchically from "0" to "7" (or in a different embodiment 0 to 7) based on their decodability so that any picture with a particular tier number does not depend directly or indirectly on any picture with a higher tier number.

In some embodiments, each picture in the video stream may belong to one of the N tiers, such as N equal to 8. For any value of k equal to 0, . . . 7, any picture in the kth tier shall not depend directly or indirectly on the processing or decoding of any picture in the (k+1)th tier or above. This implies that a picture that depends on a reference picture cannot have a tier number smaller than the tier number of the reference picture.

In embodiments, the lowest tier number may consist of the first level of picture extractability, and each subsequent tier may correspond to the next level of picture extractability in the video stream. All RAP pictures may belong to Tier 0 and all Tier 0 pictures may be RAP pictures. A certain tier, such as Tier 5 in one embodiment, may be assigned to the largest tier number that may be assigned to reference pictures that are intended to be extracted for trick modes. The tiers above the certain tier, such as in this case, Tiers 6 and 7, may correspond to the last level of picture extractability and correspond to pictures deemed discardable, which are pictures that are not used as reference pictures. In this example, Tiers 6 and 7 pictures are intended to be discardable for trick-mode purposes and do not depend on other Tier 6 and 7 pictures.

In some embodiments, for HEVC bitstreams, all pictures that are not reference pictures belong to Tier 7 in one embodiment. In an alternate embodiment, all pictures that are not reference pictures belong to Tier 7 or Tier 6. When video decoding of an HEVC bitstream starts at a RAP, starting from a RAP picture and including the RAP picture, for any value of k equal to 0, . . . 7, except for Tier k picture that is a RASL picture, a Tier k picture associated with the RAP picture is decodable if all immediately-preceding Tier 0 through Tier k pictures, inclusive, in the video stream have been decoded. Specifically, when video decoding of an HEVC bitstream starts at a RAP picture with nal_unit_type equal to BLA_W_LP or CRA_NUT, each of the RASL pictures associated with the RAP picture, if present, are not decodable irrespective of the Tier number associated with the picture.

A RASL picture may have nal_unit_type equal to RASL_R (i.e., be a reference picture) or RASL_N (i.e., not be a reference picture, as specified in the HEVC specification). Irrespective of the Tier number, all RASL pictures that are not decodable when video decoding of an HEVC bitstream starts at a RAP picture with nal_unit_type equals to BLA_W_LP or CRA_NUT. If the RAP picture is a CRA, the value of the variable HandleCraAsBlaFlag shall be equal to 1 and the variable NoRaslOutputFlag shall be set equal to HandleCraAsBlaFlag.

Per the HEVC specification, the value of "nuh_temporal_id_plus1 minus 1" in the NAL unit header of each NAL unit in an AU may specify a temporal identifier for the NAL unit. The value of nuh_temporal_id_plus1 shall not be equal to 0. The TemporalId of a picture is derived as follows: TemporalId equal to nuh_temporal_id_plus1−1.

The TemporalId of all RAP pictures may be equal to 0. However, a picture that is not a RAP picture may also have TemporalId equal to 0. The maximum TemporalId value that a picture may have is equal to the value sps_max_sub_layers_minus1 provided in the active SPS, per the HEVC specification.

According to embodiments of the present disclosure, all the tier number corresponding to a picture and specified in its corresponding transport packet, shall be according to the following: 1) All IRAP pictures shall have tier equal to the lowest tier number (e.g., 0 in one embodiment, or 1 in an alternate embodiment). 2) All pictures with a TemporalId value equal to 0 that are not RAP pictures shall have a tier value equal to one more than the tier number corresponding to the RAP pictures. 3) All pictures with with TemporalId to a value greater than 0 that are reference pictures shall have a tier value equal to TemporalId plus 1. 4) All pictures with TemporalId equal to sps_max_sub_layers_minus1 that are not reference pictures shall have a tier value equal to 7.

In some embodiments, the tier number corresponding to a picture shall be according to the following: 1) All IRAP pictures shall have tier equal 0. 2) All pictures with a TemporalId equal to 0 that are not RAP pictures have a tier equal to 1. 3) All pictures with TemporalId greater than 0 that are reference pictures may have tier equal to TemporalId+1. 4) All pictures with TemporalId equal to sps_max_sub_layers_minus1 that are not reference pictures shall have a tier equal to 7.

Figure 1:
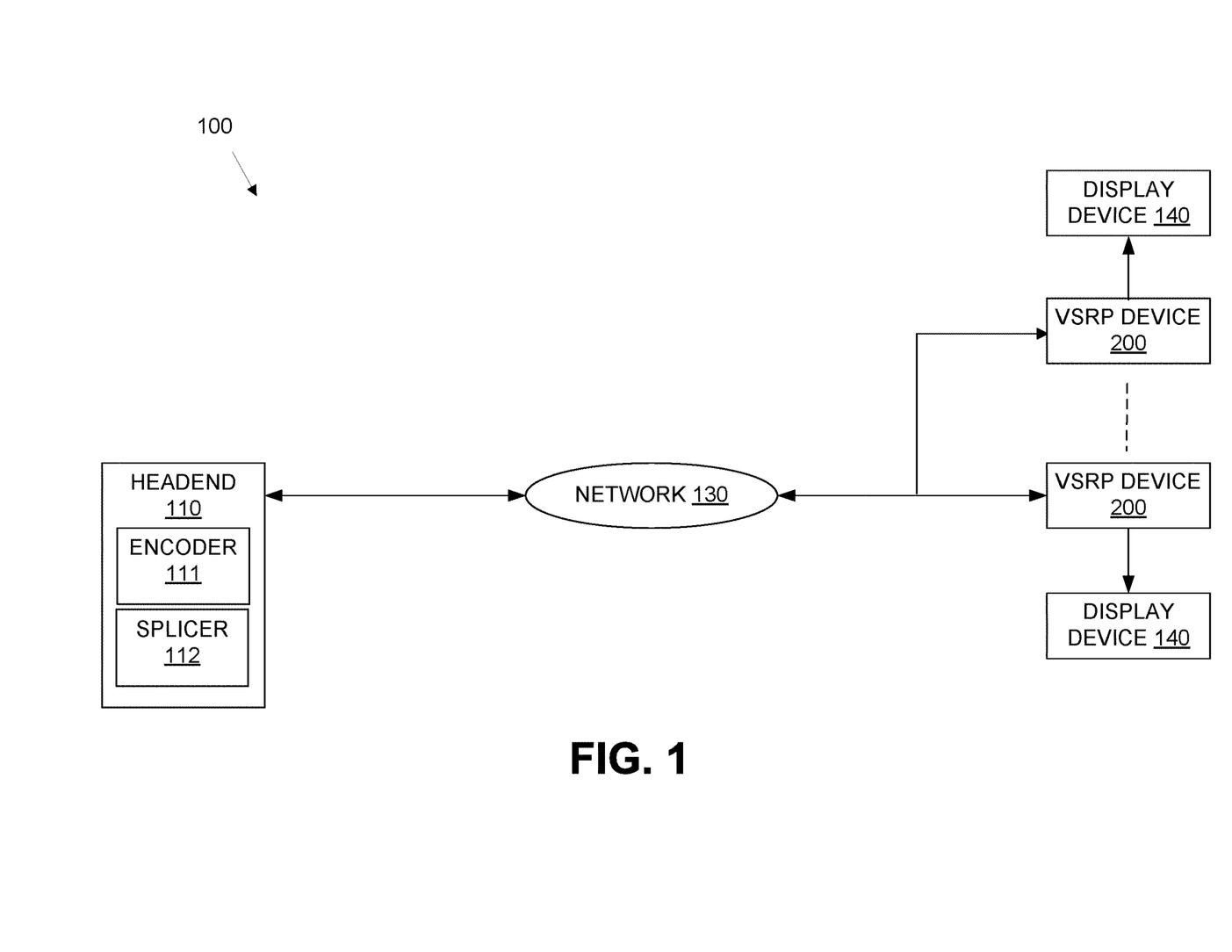
FIG. 1 is a block diagram that illustrates an example environment in which video processing (VP) systems and methods may be implemented.

FIG. 1 is a high-level block diagram depicting an example environment in which one or more embodiments of a video processing (VP) system are implemented. In particular, FIG. 1 is a block diagram that depicts an example subscriber television system (STS) 100. In this example, the STS 100 includes a headend 110 and one or more video stream receive-and-process (VSRP) devices 200. In some embodiments, one of the VSRP devices 200 may be equipped with functionality to process assistance information that affects proper trick mode functionality.

According to embodiments of the present disclosure, an HEVC receiver, such as VSRP device 200, may have at least the following non-limiting attributes: 1) Able to parse and decode the normative elements from HEVC that are specified with constraints in this standard; 2) Not adversely affected by the presence or absence of optional and informative elements from HEVC; 3) Able to parse and process all elements (including optional elements) from HEVC Annex D (SEI messages) and Annex E (VUI syntax elements) that are normatively specified and/or constrained by this standard and conveyed in-band; 4) Not adversely affected by the presence or absence of optional elements from ISO/IEC 13818-1 (such as data in adaptation fields)

that are specified with constraints in this standard; 5) Supports the processing of end_of_bitstream_rbsp( ) syntax element required by applications where another bitstream follows the end_of_bitstream NAL unit. The bitstream that follows may start with an IDR picture (NAL unit type=20, IDR_N_LP) and may be accompanied by a time base discontinuity. Management of DPB frame buffers in accordance with the HEVC Specification supports graceful output transitions between fields and frames at an SHRAP containing an IDR or BLA picture; and 6) Supports the processing of elementary streams in Low Delay Mode and Still Pictures.

The VSRP devices 200 and the headend 110 are coupled via a network 130. The headend 110 and the VSRP devices 200 cooperate to provide a user with television services, including, for example, broadcast television programming, interactive program guide (IPG) services, VOD services, PVR services, DVR services, and pay-per-view, as well as other digital services such as music, Internet access, commerce (e.g., home-shopping), voice-over-IP (VOIP), and/or other telephone or data services.

The VSRP device 200 is typically situated at a user's residence or place of business and may be a stand-alone unit or integrated into another device such as, for example, the display device 140, a personal computer, personal digital assistant (PDA), mobile phone, among other devices. In other words, the VSRP device 200 (also referred to herein as a digital receiver or processing device or digital home communications terminal (DHCT)) may comprise one of many devices or a combination of devices, such as a set-top box, television with communication capabilities, cellular phone, personal digital assistant (PDA), or other computer or computer-based device or system, such as a laptop, personal computer, DVD/CD recorder, among others. As set forth above, the VSRP device 200 may be coupled to the display device 140 (e.g., computer monitor, television set, etc.), or in some embodiments, may comprise an integrated display (with or without an integrated audio component).

The VSRP device 200 receives signals (video, audio and/or other data) including, for example, digital video signals in a compressed representation of a digitized video signal such as, for example, a composite video signal ("CVS") modulated on a carrier signal, and/or analog information modulated on a carrier signal, among others, from the headend 110 through the network 130, and provides reverse information to the headend 110 through the network 130.

Television services may be presented via respective display devices 140, each which typically comprises a television set. However, the display devices 140 may also be any other device capable of displaying the sequence of pictures of a video signal including, for example, a computer monitor, a mobile phone, game device, etc. In one implementation, the display device 140 is configured with an audio component (e.g., speakers), whereas in some implementations, audio functionality may be provided by a device that is separate yet communicatively coupled to the display device 140 and/or VSRP device 200. Although shown communicating with a display device 140, the VSRP device 200 may communicate with other devices that receive, store, and/or process bitstreams from the VSRP device 200, or that provide or transmit bitstreams or uncompressed video signals to the VSRP device 200.

The network 130 may comprise a single network, or a combination of networks (e.g., local and/or wide area networks). Further, the communications medium of the network 130 may comprise a wired connection or wireless connection (e.g., satellite, terrestrial, wireless LAN, etc.), or a combination of both. In the case of wired implementations, the network 130 may comprise a hybrid-fiber coaxial (HFC) medium, coaxial, optical, twisted pair, etc. Other networks are contemplated to be within the scope of the disclosure, including networks that use packets incorporated with and/or are compliant to MPEG-2 transport with HEVC coding or other transport layers or coding protocols.

The headend 110 may include one or more server devices (not shown) for providing video, audio, and other types of media or data to client devices such as, for example, the VSRP device 200. The headend 110 may receive content from sources external to the headend 110 or STS 100 via a wired and/or wireless connection (e.g., satellite or terrestrial network), such as from content providers, and in some embodiments, may receive package-selected national or regional content with local programming (e.g., including local advertising) for delivery to subscribers. The headend 110 also includes one or more encoders (encoding devices or compression engines) 111 (one shown) and one or more video processing devices embodied as one or more splicers 112 (one shown) coupled to the encoder 111. In some embodiments, the encoder 111 and splicer 112 may be co-located in the same device and/or in the same locale (e.g., both in the headend 110 or elsewhere), while in some embodiments, the encoder 111 and splicer 112 may be distributed among different locations within the STS 100. For instance, though shown residing at the headend 110, the encoder 111 and/or splicer 112 may reside in some embodiments at other locations such as a hub or node. The encoder 111 and splicer 112 are coupled with suitable signaling or provisioned to respond to signaling for portions of a video service where commercials are to be inserted.

The encoder 111 provides a compressed bitstream (e.g., in a transport stream) to the splicer 112 while both receive signals or cues that pertain to splicing or digital program insertion. In some embodiments, the encoder 111 does not receive these signals or cues. In one embodiment, the encoder 111 and/or splicer 112 are further configured to provide assistance information corresponding tier numbers and other information in the bitstream to convey to the VSRP devices 200 instructions corresponding to affect extraction of pictures for trick mode operation as previously described.

Further, the splicer 112 may pass the assistance information provided by the encoder 111, with or without modification, to the VSRP device 200, or the encoder 111 may provide the assistance information directly (bypassing the splicer 112) to the VSRP device 200.

The STS 100 may comprise an IPTV network, a cable television network, a satellite television network, a subscriber network, or a combination of two or more of these networks or other networks. Further, network PVR and switched digital video are also considered within the scope of the disclosure. Although described in the context of video processing, it should be understood that certain embodiments of the VP systems described herein also include functionality for the processing of other media content such as compressed audio streams.

The STS 100 comprises additional components and/or facilities not shown, as should be understood by one having ordinary skill in the art. For instance, the STS 100 may comprise one or more additional servers (Internet Service Provider (ISP) facility servers, private servers, on-demand servers, channel change servers, multi-media messaging servers, program guide servers), modulators (e.g., QAM, QPSK, etc.), routers, bridges, gateways, multiplexers, transmitters, and/or switches (e.g., at the network edge, among other locations) that process and deliver and/or forward (e.g., route) various digital services to subscribers.

In one embodiment, the VP system comprises the headend 110 and one or more of the VSRP devices 200. In some embodiments, the VP system comprises portions of each of these components, or in some embodiments, one of these components or a subset thereof. In some embodiments, one or more additional components described above yet not shown in FIG. 1 may be incorporated in a VP system, as should be understood by one having ordinary skill in the art in the context of the present disclosure.

Figure 2:
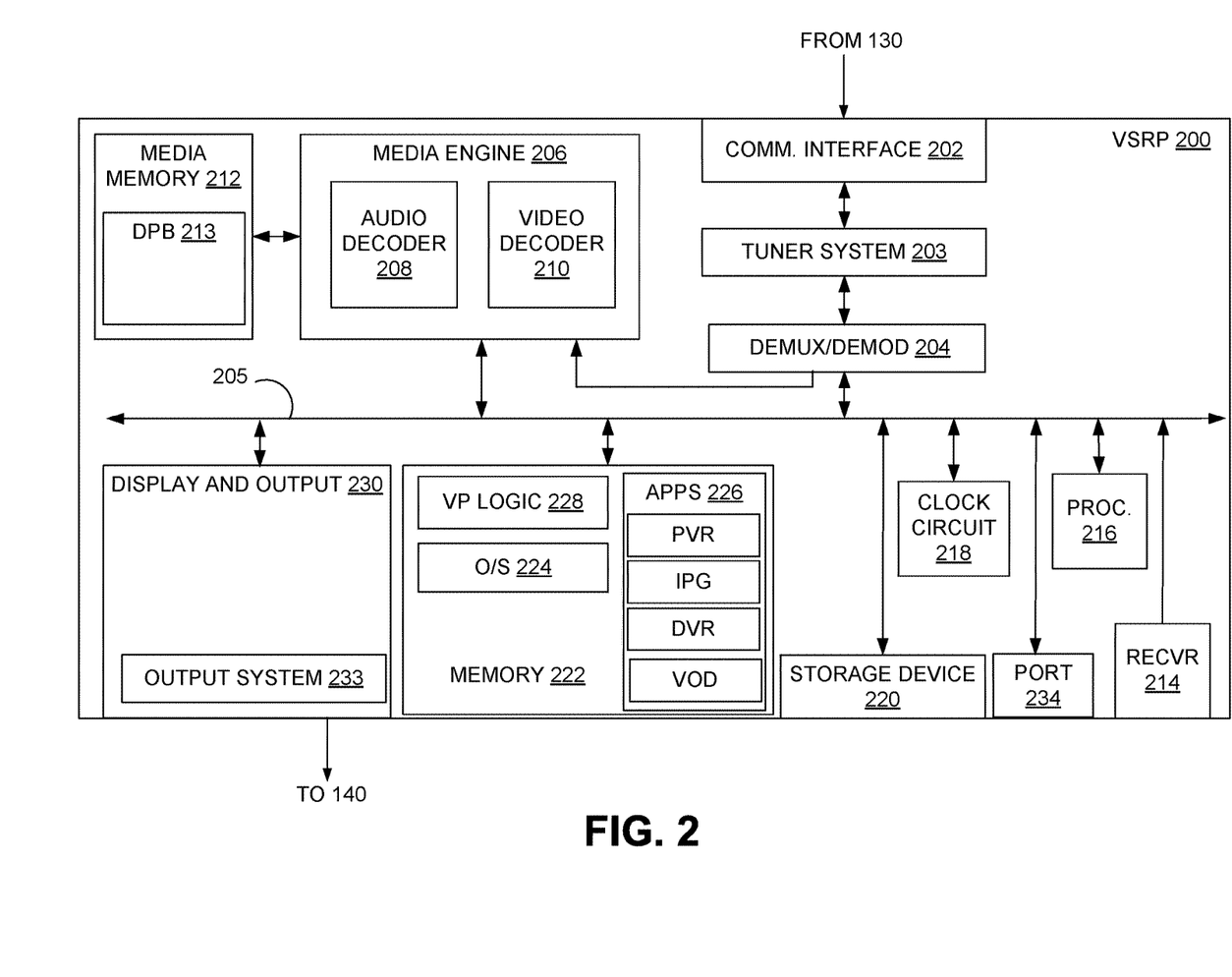
FIG. 2 is a block diagram of an example embodiment of a video stream receive-and-process (VSRP) device comprising an embodiment of a VP system.

FIG. 2 is an example embodiment of select components of a VSRP device 200. It should be understood by one having ordinary skill in the art that the VSRP device 200 shown in FIG. 2 is merely illustrative, and should not be construed as implying any limitations upon the scope of the disclosure. In one embodiment, a VP system may comprise all components shown in, or described in association with, the VSRP device 200 of FIG. 2. In some embodiments, a VP system may comprise fewer components, such as those limited to facilitating and implementing the decoding of compressed bitstreams and/or output pictures corresponding to decoded versions of coded pictures in the bitstream. In some embodiments, functionality of the VP system may be distributed among the VSRP device 200 and one or more additional devices as mentioned above.

The VSRP device 200 includes a communication interface 202 (e.g., depending on the implementation, suitable for coupling to the Internet, a coaxial cable network, an HFC network, satellite network, terrestrial network, cellular network, etc.) coupled in one embodiment to a tuner system 203. The tuner system 203 includes one or more tuners for receiving downloaded (or transmitted) media content. The tuner system 203 can select from a plurality of transmission signals provided by the STS 100 (FIG. 1). The tuner system 203 enables the VSRP device 200 to tune to downstream media and data transmissions, thereby allowing a user to receive digital media content via the STS 100. The tuner system 203 includes, in one implementation, an out-of-band tuner for bi-directional data communication and one or more tuners (in-band) for receiving television signals. In some embodiments (e.g., IPTV-configured VSRP devices), the tuner system may be omitted.

The tuner system 203 is coupled to a demultiplexing/demodulation system 204 (herein, simply demux 204 for brevity). The demux 204 may include MPEG-2 transport demultiplexing capabilities. When tuned to carrier frequencies carrying a digital transmission signal, the demux 204 enables the separation of packets of data, corresponding to the desired video stream, for further processing. Concurrently, the demux 204 precludes further processing of packets in the multiplexed transport stream that are irrelevant or not desired, such as packets of data corresponding to other bitstreams. Parsing capabilities of the demux 204 allow for the ingesting by the VSRP device 200 of program associated information carried in the bitstream. The demux 204 is configured to identify and extract information in the bitstream, such as assistance information, to facilitate the identification, extraction, and processing of the coded pictures. Other such information includes Program Specific Information (PSI) (e.g., Program Map Table (PMT), Program Association Table (PAT), etc.) and parameters or syntactic elements (e.g., Program Clock Reference (PCR), time stamp information, payload_unit_start_indicator, etc.) of the transport stream (including packetized elementary stream (PES) packet information).

In one embodiment, additional information extracted by the demux 204 includes the aforementioned assistance information pertaining to the bitstream that assists the decoding logic (in cooperation with the processor 216 executing code of the VP logic 228) to affect certain behavior to provide the requested trick mode, wherein the assistance information pertains to picture interdependencies related by successive tier numbers, and in some embodiments, further assists display and output logic 230 (in cooperation with the processor 216 executing code of the VP logic 228) in processing reconstructed pictures for display and/or output.

The demux 204 is coupled to a bus 205 and to a media engine 206. The media engine 206 comprises, in one embodiment, decoding logic comprising one or more of a respective audio decoder 208 and video decoder 210. The media engine 206 is further coupled to the bus 205 and to media memory 212, the latter which, in one embodiment, comprises one or more respective buffers for temporarily storing compressed (compressed picture buffer or bit buffer, not shown) and/or reconstructed pictures (decoded picture buffer or DPB 213). In some embodiments, one or more of the buffers of the media memory 212 may reside in other memory (e.g., memory 222, explained below) or components.

The VSRP device 200 further comprises additional components coupled to the bus 205 (though shown as a single bus, one or more buses are contemplated to be within the scope of the embodiments). For instance, the VSRP device 200 further comprises a receiver 214 (e.g., infrared (IR), radio frequency (RF), etc.) configured to receive user input (e.g., via direct-physical or wireless connection via a keyboard, remote control, voice activation, etc.) to convey a user's request or command (e.g., for program selection, trick mode manipulation such as fast forward, rewind, pause, channel change, one or more processors (one shown) 216 for controlling operations of the VSRP device 200, and a clock circuit 218 comprising phase and/or frequency locked-loop circuitry to lock into a system time clock (STC) from a program clock reference, or PCR, received in the bitstream to facilitate decoding and output operations. Although described in the context of hardware circuitry, some embodiments of the clock circuit 218 may be configured as software (e.g., virtual clocks) or a combination of hardware and software. Further, in some embodiments, the clock circuit 218 is programmable.

The VSRP device 200 may further comprise a storage device 220 (and associated control logic as well as one or more drivers in memory 222) to temporarily store buffered media content and/or more permanently store recorded media content. The storage device 220 may be coupled to the bus 205 via an appropriate interface (not shown), as should be understood by one having ordinary skill in the art.

Memory 222 in the VSRP device 200 comprises volatile and/or non-volatile memory, and is configured to store executable instructions or code associated with an operating system (0/S) 224 and other applications, and one or more applications 226 (e.g., interactive programming guide (IPG), video-on-demand (VOD), personal video recording (PVR), WatchTV (associated with broadcast network TV), among other applications not shown such as pay-per-view, music, driver software, etc.).

Further included in one embodiment in memory 222 is video processing (VP) logic 228, which in one embodiment is configured in software. In some embodiments, VP logic 228 may be configured in hardware, or a combination of hardware and software. The VP logic 228, in cooperation with the processor 216, is responsible for interpreting assistance information and providing the appropriate settings for a display and output system 230 of the VSRP device 200. In some embodiments, functionality of the VP logic 228 may reside in another component within or external to memory 222 or be distributed among multiple components of the VSRP device 200 in some embodiments.

The VSRP device 200 is further configured with the display and output logic 230, as indicated above, which includes one or more output systems (e.g., configured as HDMI, DENC, or others well-known to those having ordinary skill in the art) 233 to process the decoded pictures and provide for presentation (e.g., display) on display device 140. Though shown conceptually in FIG. 2 as an entity separate from the media engine 206, in some embodiments, one or more of the functionality of the display and output logic 230 may be incorporated in the media engine 206 (e.g., on a single chip) or elsewhere in some embodiments.

A communications port 234 (or ports) is (are) further included in the VSRP device 200 for receiving information from and transmitting information to other devices. For instance, the communication port 234 may feature USB (Universal Serial Bus), Ethernet, IEEE-1394, serial, and/or parallel ports, etc. The VSRP device 200 may also include one or more analog video input ports for receiving and/or transmitting analog video signals.

One having ordinary skill in the art should understand that the VSRP device 200 may include other components not shown, including decryptors, samplers, digitizers (e.g., analog-to-digital converters), multiplexers, conditional access processor and/or application software, driver software, Internet browser, among others. Further, though the VP logic 228 is illustrated as residing in memory 222, it should be understood that all or a portion of such logic 228 may be incorporated in, or distributed among, the media engine 206, the display and output system 230, or elsewhere. Similarly, in some embodiments, functionality for one or more of the components illustrated in, or described in association with, FIG. 2 may be combined with another component into a single integrated component or device.

The VP system (e.g., encoder 111, splicer 112, decoding logic (e.g., media engine 206), and/or display and output logic 230) may be implemented in hardware, software, firmware, or a combination thereof. To the extent certain embodiments of the VP system or a portion thereof are implemented in software or firmware (e.g., including the VP logic 228), executable instructions for performing one or more tasks of the VP system are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments of the VP system or portions thereof are implemented in hardware, the VP system may be implemented with any or a combination of the following technologies, which are all well known in the art: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Having addressed certain embodiments of VP systems that decode the coded pictures of a bitstream, attention is directed to the use of the assistance information (or a separate and distinct piece of assistance information in some embodiments) to assist the affecting of trick mode functionality. An output clock (e.g., a clock residing in the clocking circuit 218 or elsewhere) residing in the VSRP device 200 drives the output of reconstructed pictures (e.g., with an output system 233 configured as HDMI or a DENC or other known output systems). The display and output logic 230 may operate in one of plural modes. In one mode, often referred to as passthrough mode, the VSRP device 200 behaves intelligently, providing an output picture format corresponding to the picture format determined upon the acquisition or start of a video service (such as upon a channel change) in union with the format capabilities of the display device 140 and user preferences. In a fixed mode (or also referred to herein as a non-passthrough mode), the output picture format is fixed by user input or automatically (e.g., without user input) based on what the display device 140 supports (e.g., based on interrogation by the set-top box of display device picture format capabilities).

In one embodiment, the splicer 112 and/or encoder 111 deliver assistance information for reception and processing by the display and output logic 230, the assistance information conveying to the display and output logic 230 information to affect certain behavior to provide the requested trick mode, wherein the assistance information pertains to picture interdependencies related by successive tier numbers output of the decoded pictures. In some embodiments a part of the assistance information may be provided according to a different mechanism or via a different channel or medium.

Figure 3:
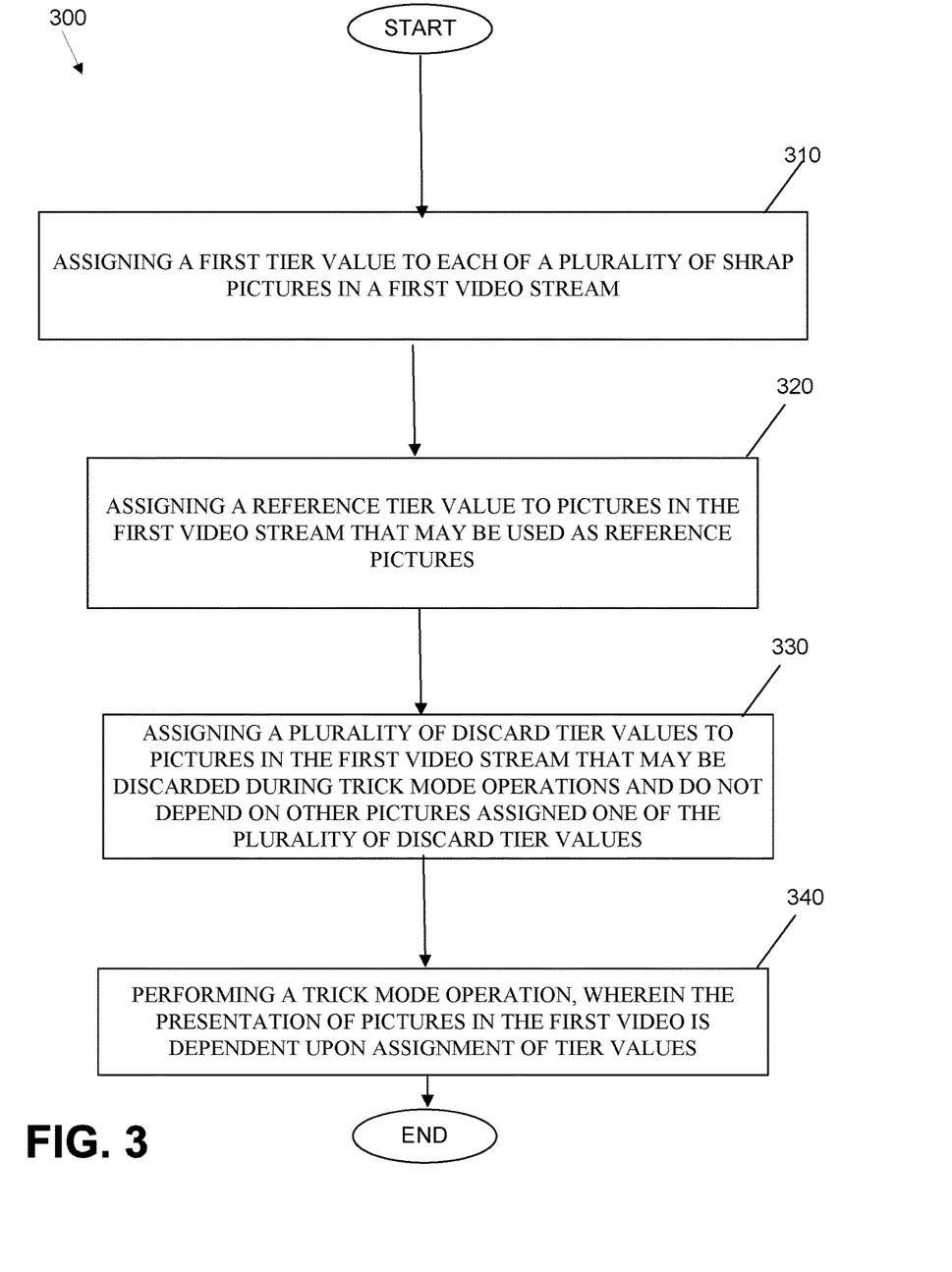
FIG. 3 is a flow diagram that illustrates one example method embodiment to process video comprising assistance information.

FIG. 3 is a flowchart illustrating processing a video stream according to embodiments of the present disclosure. Method 300 may start at step 310. At step 310, a first tier value may be assigned to each of a plurality of SHRAP pictures in a first video stream. For example, each SHRAP picture may be assigned a tier value of 1. In some embodiments, the first tier value represents a lowest level of extractability. In some embodiments, no tier values lower than the first tier value may be assigned to any picture in the first video stream. A SHRAP Picture may comprise an IRAP-picture that is part of an SHRAP Access Unit or an intra-coded field picture with NAL unit type=TRAIL R that is part of an SHRAP AU.

Method 300 may then proceed to step 320 where a reference tier value may be assigned to pictures in the first video stream that may be used as reference pictures. For example, tier values 2 to 5 may be used as reference tier values. Specifically, in some embodiments, the plurality of reference tier values are each greater than the first tier value. In some embodiments, all field-coded pictures in the first video stream that belong to a same frame may have the same tier value. In some embodiments, a reference tier value may be equal to a respective temporal id associated with each picture in the first video stream that may be used as reference picture.

Method 300 may next proceed to step 330. At step 330, a plurality of discard tier values may be assigned to pictures in the first video stream that may be discarded during trick mode operations and do not depend on other pictures assigned one of the plurality of discard tier values. For example, such picture may be assigned a tier value of 6 or 7. In some embodiments of the present disclosure, tier value changes may be prevented during the presentation of a program in the first video stream. In some embodiments, the reference tier value and the discard tier values may be equal to a respective temporal id associated with each picture in the first video stream.

Method 300 may proceed to step 340 where a trick mode operation may be performed, wherein the presentation of pictures in the first video is dependent upon assignment of tier values. In some embodiments, pictures in the first video stream assigned a reference tier value for trick mode operations may be extracted to execute the trick mode functionality.

Figure 4:
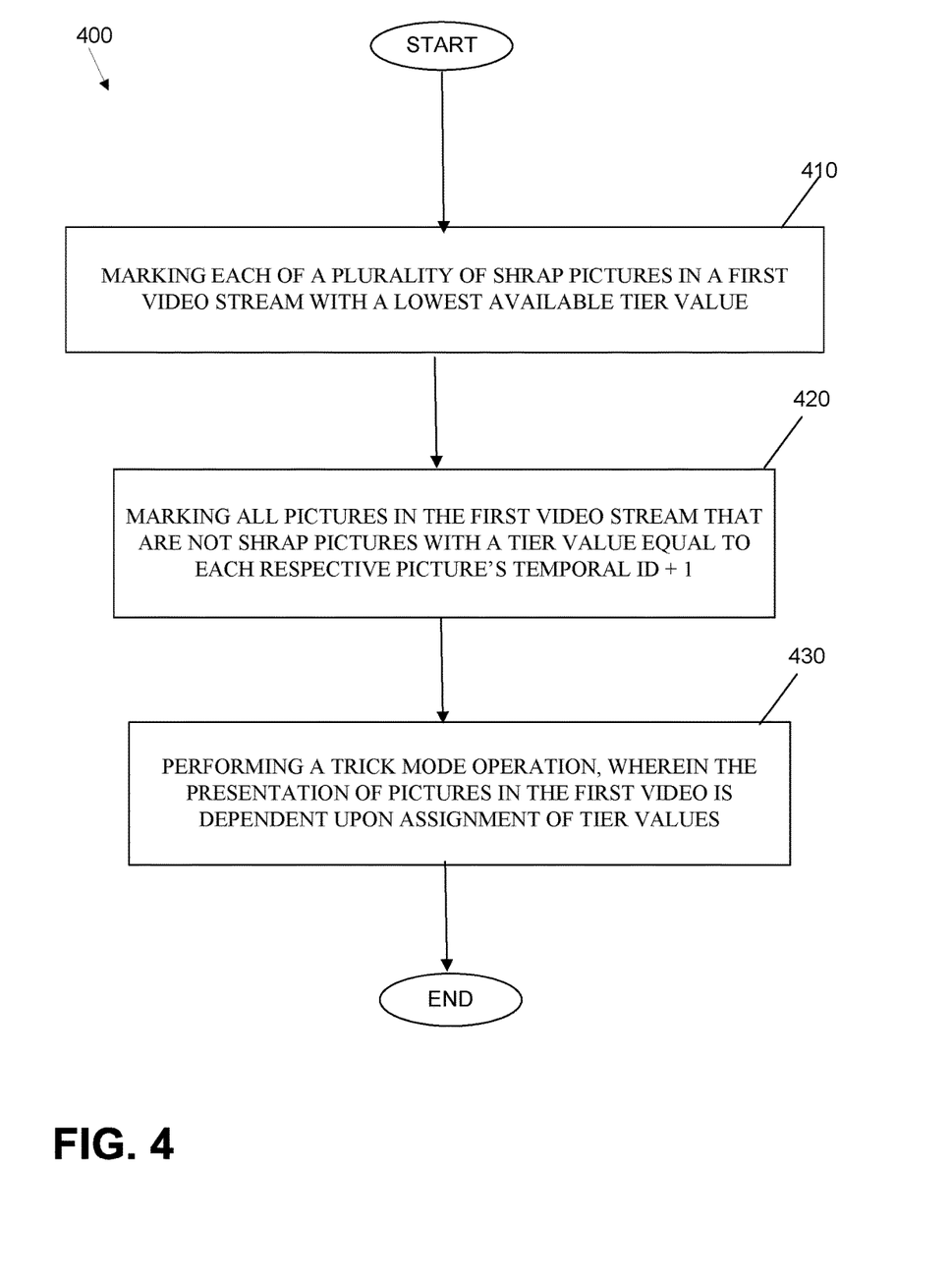
FIG. 4 is a flow diagram that illustrates one example method embodiment to process video comprising assistance information.

FIG. 4 is a flowchart illustrating processing a video stream according to embodiments of the present disclosure. Method 400 may start at step 410. At step 410, each of a plurality of SHRAP pictures in a first video stream may be marked with a lowest available tier value.

Method 400 may then proceed to step 420 where all pictures in the first video stream that are not SHRAP pictures may be marked with a tier value equal to each respective picture's temporal id+1. In some embodiments, a first tier value may be identified as a threshold tier value such that tier values above the threshold tier value indicate pictures that are discardable. Correspondingly, all pictures in the first video stream that are not reference pictures may be assigned a tier value higher than the threshold tier value.

Method 400 may proceed to step 430. At step 430, a trick mode operation may be performed, wherein the presentation of pictures in the first video is dependent upon assignment of tier values. For example, discardable pictures in the first video stream may be determined as pictures marked with a highest tier value. In some embodiments, a RAP picture may only be decoded in the first video stream only if all immediately preceding picture with an equal or lower tier value have been decoded. Tier values may be ordered hierarchically based on decodability such that any picture with a particular tier value does not depend directly or indirectly on any picture with a higher tier value.

Figure 5:
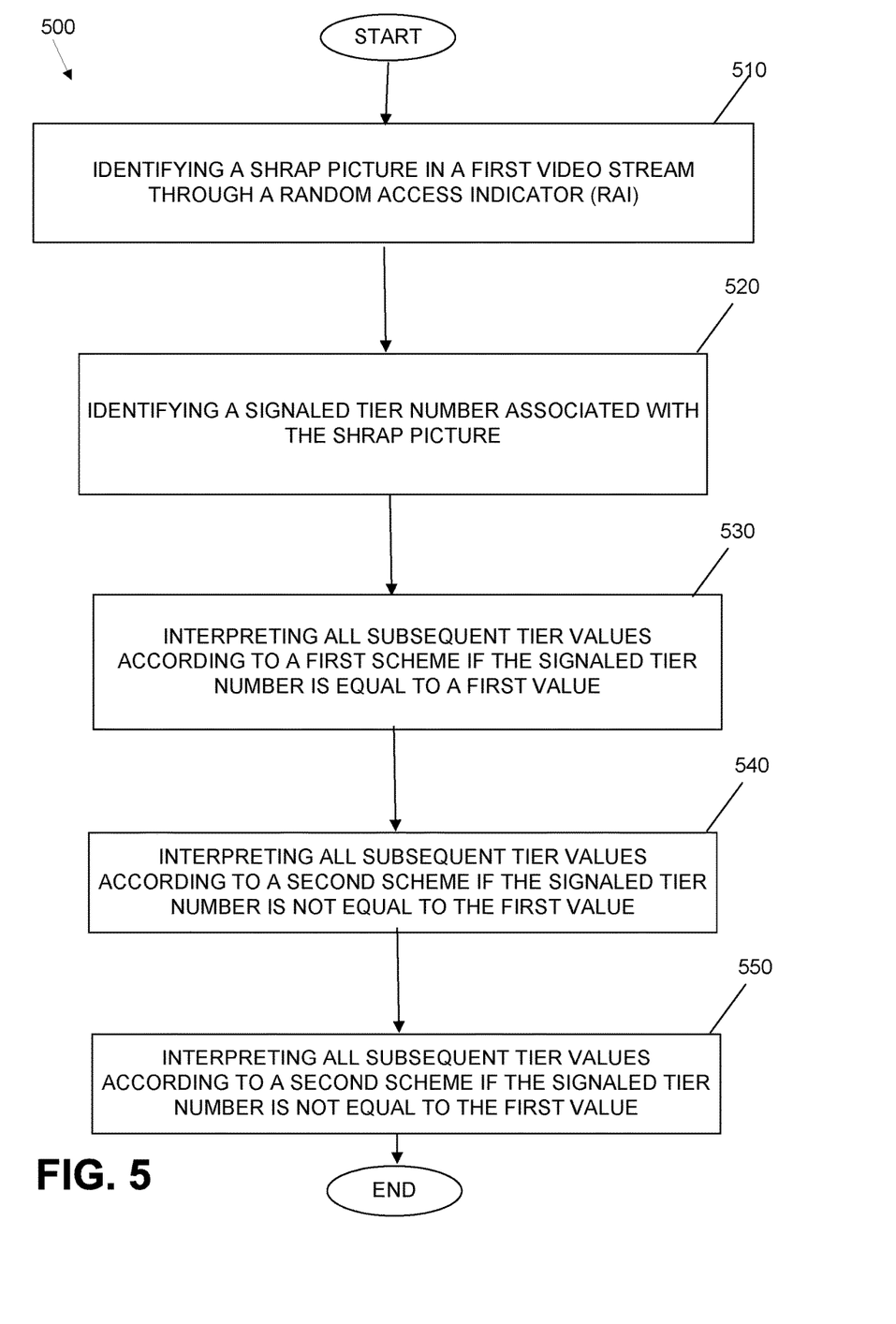
FIG. 5 is a flow diagram that illustrates one example method embodiment to process video comprising assistance information.

FIG. 5 is a flowchart illustrating processing a video stream according to embodiments of the present disclosure. Method 500 may start at step 510. At step 510, a SHRAP picture in a first video stream may be identified through a Random Access Indicator (RAI). Method 500 may proceed to step 520 where, a signaled tier number associated with the SHRAP picture may be identified.

Method 500 may next proceed to step 530. At step 530, all subsequent tier values may be interpreted according to a first scheme if the signaled tier number is equal to a first value. At step 540, all subsequent tier values may be interpreted according to a second scheme if the signaled tier number is not equal to the first value. Finally, method 500 may proceed to step 550 where the first video stream may be output for presentation, wherein the presentation of pictures in the first video stream is dependent upon interpreted tier values.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, steps of processes identified in FIGS. 3, 4, and 5 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIGS. 3, 4, and 5 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the VP systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

We claim:

1. A method for processing a video stream comprising:
assigning a first tier value to each of a plurality of SHRAP pictures in a first video stream, wherein each of the plurality of SHRAP pictures comprise one of the following: an IRAP-picture that is part of an SHRAP Access Unit (AU) and an intra-coded field picture with NAL unit type=TRAIL_R that is part of an SHRAP AU;
assigning a tier value greater than the first tier value to each picture in the first video stream that is not the plurality of SHRAP pictures, wherein assigning the tier value to the each picture in the first video stream that is not the plurality of SH RAP pictures comprises:
assigning a reference tier value to pictures in the first video stream that may be used as reference pictures; and
assigning a plurality of discard tier values to pictures in the first video stream that may be discarded during trick mode operations and do not depend on other pictures assigned one of the plurality of discard tier values; and
performing a trick mode operation, wherein a presentation of pictures in the first video stream is dependent upon assignment of tier values.

2. The method of claim 1, wherein the first tier value represents a lowest level of extractability.

3. The method of claim 1, further comprising: extracting pictures in the first video stream assigned the reference tier value for trick mode operations.

4. The method of claim 1, further comprising: not assigning a tier value lower than the first tier value to any picture in the first video stream.

5. The method of claim 1, further comprising: preventing tier value changes during a presentation of a program in the first video stream.

6. The method of claim 1, wherein all field-coded pictures in the first video stream that belong to a same frame have the same tier value.

7. The method of claim 1, wherein the reference tier value is equal to a respective temporal id associated with each picture in the first video stream that may be used as reference picture.

8. The method of claim 1, wherein the reference tier value and the discard tier values are equal to a respective temporal id associated with each picture in the first video stream.

9. A system comprising: a memory storage; and
a processing unit coupled to the memory storage, wherein the processing unit is operative to:
assign a first tier value to each of a plurality of SHRAP pictures in a first video stream wherein each of the plurality of SHRAP pictures comprise one of the following: an IRAP-picture that is part of an SHRAP Access Unit (AU) and an intra-coded field picture with NAL unit type=TRAIL_R that is part of an SHRAP AU;

assign a tier value greater than the first tier value to each picture in the first video stream which is not the plurality of SHRAP pictures, wherein the processing unit being operative to assign the tier value each picture in the first video stream which is not the plurality of SHRAP pictures comprises the processing unit operative to:

assign a reference tier value to pictures in the first video stream that may be used as reference pictures; and assign a plurality of discard tier values to pictures in the first video stream that may be discarded during trick mode operations and do not depend on other pictures assigned one of the plurality of discard tier values; and perform a trick mode operation, wherein a presentation of pictures in the first video stream is dependent upon assignment of tier values.

10. The system of claim 9, wherein the first tier value represents a lowest level of extractability.

11. The system of claim 9, wherein the processing unit is further operative to extract pictures in the first video stream assigned the reference tier value for trick mode operations.

12. The system of claim 9, wherein the plurality of reference tier values are each greater than the first tier value.

13. The system of claim 9, wherein the processing unit is further operative to not assign a tier value lower than the first tier value to any picture in the first video stream.

14. The system of claim 9, wherein the processing unit is further operative to prevent tier value changes during a presentation of a program in the first video stream.

15. The system of claim 9, wherein all field-coded pictures in the first video stream that belong to a same frame have the same tier value.

16. The system of claim 9, wherein the reference tier value is equal to a respective temporal id associated with each picture in the first video stream that may be used as reference picture.

17. The system of claim 9, wherein the reference tier value and the discard tier values are equal to a respective temporal id associated with each picture in the first video stream.

18. A computer-readable medium that stores a set of instructions which when executed perform a method comprising:

assigning a first tier value to each of a plurality of SHRAP pictures in a first video stream wherein each of the plurality of SHRAP pictures comprise one of the following: an IRAP-picture that is part of an SHRAP Access Unit (AU) and an intra-coded field picture with NAL unit type=TRAIL_R that is part of an SHRAP AU;

assigning a tier value greater than the first tier value to each picture in the first video stream that is not the plurality of SHRAP pictures, wherein assigning the tier value to the each picture in the first video stream that is not the plurality of SHRAP pictures comprises:

assigning a reference tier value to pictures in the first video stream that may be used as reference pictures; and assigning a plurality of discard tier values to pictures in the first video stream that may be discarded during trick mode operations and do not depend on other pictures assigned one of the plurality of discard tier values; and performing a trick mode operation, wherein a presentation of pictures in the first video stream is dependent upon assignment of tier values.

19. The computer-readable medium of claim 18, wherein the first tier value represents a lowest level of extractability.

20. The computer-readable medium of claim 18, wherein the reference tier value is greater than the first tier value, and wherein each of the plurality of discard tier values is greater than the first tier value.

* * * * *